United States Patent [19]
Kruppa

[11] Patent Number: 5,805,439
[45] Date of Patent: Sep. 8, 1998

[54] DC-TO-DC AUTO SWITCH CIRCUIT

[75] Inventor: Robert W. Kruppa, Cary, N.C.

[73] Assignee: International Business Machines Corporation, Armonk, N.Y.

[21] Appl. No.: 831,275

[22] Filed: Mar. 31, 1997

[51] Int. Cl.⁶ ................................................. H02M 1/10
[52] U.S. Cl. ........................................................ 363/142
[58] Field of Search .................... 363/78, 79, 80, 363/142; 323/299

[56] References Cited

U.S. PATENT DOCUMENTS

| | | | |
|---|---|---|---|
| 4,163,278 | 7/1979 | Onoue et al. | 363/101 |
| 4,540,892 | 9/1985 | Carvalho | 363/142 |
| 4,608,498 | 8/1986 | Falzarano et al. | 363/142 |
| 4,816,821 | 3/1989 | Lösel | 363/80 |
| 5,124,630 | 6/1992 | Tsutsumi | 323/299 |
| 5,144,222 | 9/1992 | Herbert | 323/271 |
| 5,289,361 | 2/1994 | Vinciarelli | 363/80 |
| 5,406,192 | 4/1995 | Vinciarelli | 323/299 |
| 5,499,187 | 3/1996 | Smith | 363/142 |

*Primary Examiner*—Matthew V. Nguyen
*Attorney, Agent, or Firm*—John D. Flynn; Winstead, Sechrest & Minick

[57] ABSTRACT

A circuit for controlling multiple input voltages to produce a given output voltage using only a single DC-to-DC converter. Sensing of the input voltages supplied to the circuit effect automatic switching to route the applied voltages between input terminals and output terminals, and configure the feedback network selecting the output voltage of the DC-to-DC converter. The DC-to-DC converter thus configured provides required output voltages not appearing in the input supply.

17 Claims, 2 Drawing Sheets

DC-TO-DC AUTO SWITCH CIRCUIT

TECHNICAL FIELD

The present invention relates in general to electronic power supplies, and in particular, to a circuit for automatically controlling multiple selected input voltages to produce a given output.

BACKGROUND INFORMATION

Printers for use in computer systems typically require dual voltages, namely 24 volts and 5 volts for their operation. Because it is desired to operate these printers from sources which supply either 24 volts alone or 5 volts in combination with other voltages, it is necessary to provide circuitry which either generates the missing voltage or converts the voltages supplied to the voltages needed. This function could be performed using multiple DC-to-DC converters or a manual means of switching circuitry. DC-to-DC converters are expensive and require significant board space. Manual switching is not acceptable from a user perspective. As a result, there is a need in the art for circuitry to provide for automatic switching and voltage conversion depending only on the voltages applied to the input of the switch.

SUMMARY OF THE INVENTION

The foregoing need is satisfied with the present invention, which includes a DC-to-DC converter to provide a voltage required but not otherwise provided by the input power supply, and automatic switching circuitry to switch the supplied and converted voltages between their respective sources and the output terminals of the device. A feature of the present invention is the use of a single DC-to-DC converter. A second feature of the present invention is circuitry that senses the supplied input voltages and automatically configures the DC-to-DC converter and pass-through circuits in order to supply the missing required output voltage as well as to couple the appropriate input voltage to its corresponding output terminal.

It is an advantage of the present invention that a single DC-to-DC converter is used to supply the missing required output voltage of a pair of required voltages when the input power supply fails to supply either one of the required output voltages. In order to do this, the present invention senses the input voltages supplied, and configures the voltage feedback circuitry of the DC-to-DC converter accordingly. The voltage feedback circuitry determines the output voltage of the DC-to-DC converter. Thus, either of the two required output voltages can be obtained.

A second advantage of the present invention is automatic switching between the output voltage terminals and the voltage sources. Depending on the voltages sensed at the input, the appropriate output voltage terminal is either passed directly through to its corresponding input voltage terminal or is connected to the output of the DC-to-DC converter. In this way, the required pair of output voltages is provided regardless of the power supply configuration of the system to which the device is connected, without the need for manual switching by the user.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purpose of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
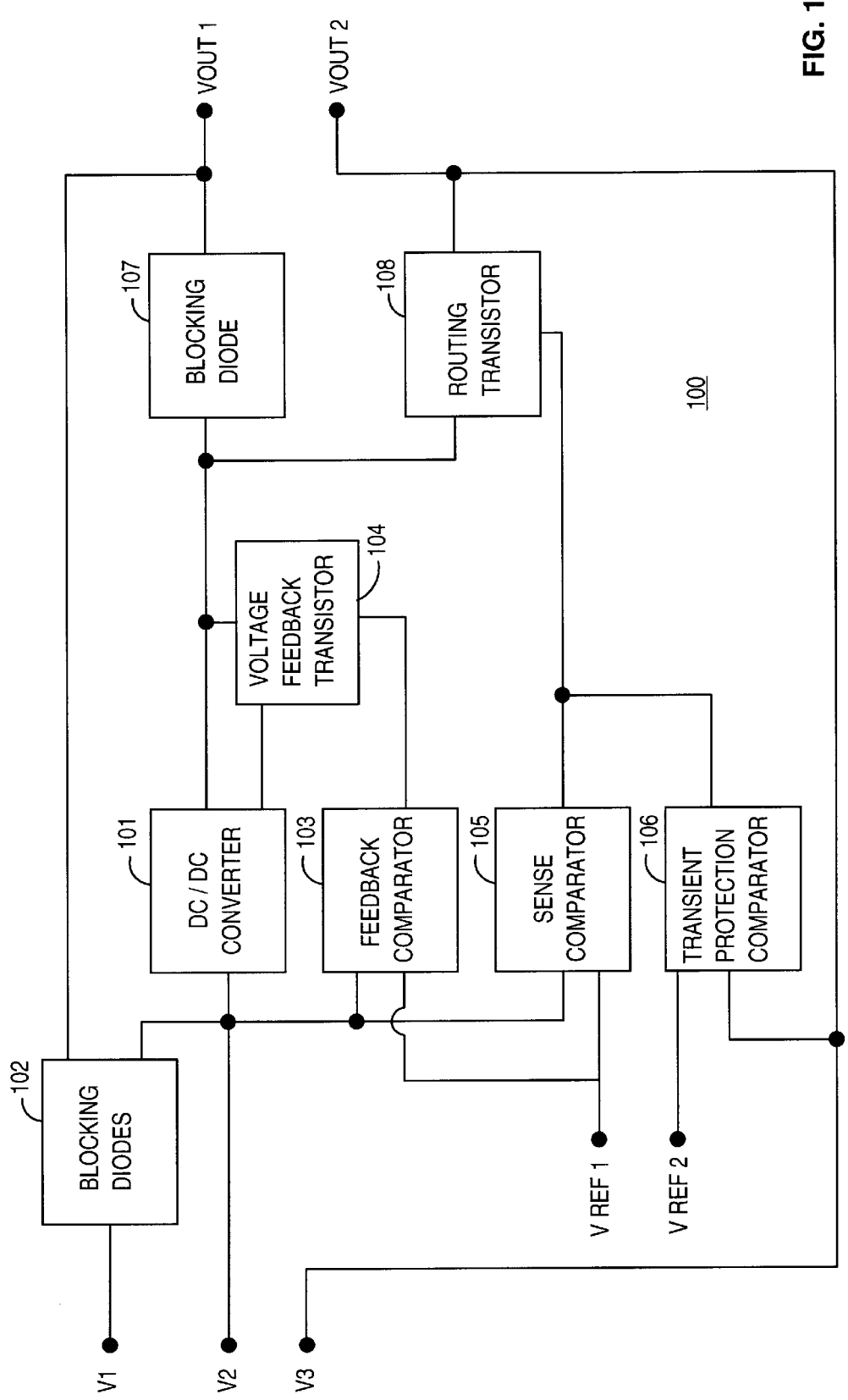
FIG. 1 illustrates a block diagram of an embodiment of the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

An invention that alleviates the problem of controlling multiple input voltages in order to provide a given set of output voltages will now be described in detail. Referring to FIG. 1, there is shown a block diagram of an auto switch circuit 100 in accordance with the present invention.

A power supply (not shown) is connected to the input pins of the circuit 100. The power supply may provide in the alternative a single voltage at $V_1$, or a pair of voltages at $V_2$ and at $V_3$. In one embodiment of the invention, the voltage at $V_1$ may be 24 volts and the voltages at $V_2$ and $V_3$ equal to 38 volts and 5 volts, respectively. However, one skilled in the art will appreciate that voltages of other levels may be present at these terminals.

The voltage at $V_1$ is applied to the input of blocking circuitry 102. Blocking circuitry 102 prevents voltage/current feedback into circuitry that may be connected to $V_1$. Blocking circuitry 102 provides a pair of outputs, each outputting the voltage at $V_1$. One output of blocking circuitry 102 is directly connected to another output terminal, $Vout_1$, and the second output is connected to the input of the DC-to-DC converter 101 (along with the voltage at $V_2$). Blocking circuitry 102 may comprise a pair of diodes having their anodes connected together, the junction of the anodes forming the input of blocking circuitry 102, and the cathodes of the two diodes each forming one of the outputs of blocking circuitry 102 (see FIG. 2).

The voltage input at $V_2$ is provided to the input terminal of DC-to-DC converter 101, one input terminal of feedback comparator 103 and one input terminal of sense comparator 105. The output of blocking circuitry 102 is also connected to this circuit net. Voltage is available at $V_2$ and $V_3$ at the same time. The voltage at $V_3$ is directly connected to an output terminal, $Vout_2$. A reference voltage, $Vref_1$ is provided to a second input of each of feedback comparator 103 and sense comparator 105. DC-to-DC convertor 101 may be a commercially available, switch-mode regulator.

Feedback comparator 103 senses when the voltage at its input exceeds a selected reference voltage, $Vref_1$. If the input voltage to feedback comparator 103 exceeds $Vref_1$ then feedback comparator 103 outputs a control voltage to feedback transistor 104 turning on feedback transistor 104. For example, in an embodiment in which the voltage at $V_1$ may be 24 volts and the voltage at $V_2$ may be 38 volts, the voltage selected at which feedback comparator 103 switches may be chosen to be 30 volts.

Voltage feedback transistor 104 controls the feedback impedance ratio that samples the output voltage of the DC-to-DC converter 101 and provides a feedback voltage to the feedback input of the DC-to-DC converter 101. Comparator 103 adjusts the feedback impedance ratio as a function of its input voltage. In this way, the output voltage of the DC-to-DC converter 101 is automatically adjusted in response to the selection of input voltages which are provided at the input terminals of the device. For example, in an embodiment in which the voltage at $V_1$ may be 24 volts, or the voltage at $V_2$ may be 38 volts and the voltage at $V_3$ may be 5 volts, if the power supply (not shown) applied to the invention consists only of a single 24 volt source, then feedback comparator 103 will be switched low, and voltage feedback transistor 104 is then turned off. The feedback voltage in this case is then set so as to establish the output voltage of the DC-to-DC converter 101 at 5 volts. Conversely, if, in this embodiment, the input power supply is such that it provides a 38 volt source at $V_2$ and a 5 volt source at $V_3$, then feedback comparator 103 switches high turning on voltage feedback transistor 104. Turning on voltage feedback transistor 104 establishes a feedback voltage at the feedback input to DC-to-DC converter 101 such that the DC-to-DC converter provides 24 volts at its output terminal.

Additional switching and steering are provided by sense comparator 105, routing transistor 108 and blocking circuitry 107. The output of DC-to-DC converter 101 is provided to output pin $V_{out}$, through blocking circuitry 107. Blocking circuitry 107 prevents voltage/current feedback to the voltage output terminal of the DC-to-DC converter 101 from the output of blocking circuitry 102 that is also directly coupled to $Vout_1$. The output of DC-to-DC converter 101 is also steered to $Vout_2$ by the action of routing transistor 108.

The routing action of routing transistor 108 is principally controlled by sense comparator 105. A voltage appearing at voltage input terminal $V_2$, which is also the voltage that appears at the second output of blocking circuitry 102, since they are connected together, is applied to one input of sense comparator 105. This input will hereinafter be referred to as the control input. $Vref_1$ is applied to the other input of sense comparator 105. This input will hereinafter be referred to as the reference input. If the voltage appearing at the control input of sense comparator 105 is less than the selected reference voltage, $Vref_1$, then sense comparator 105 switches, providing a high voltage at its output, turning on routing transistor 108. When routing transistor 108 turns on, the voltage output of DC-to-DC converter 101 is connected to output terminal $Vout_2$. For example, in an embodiment in which the voltage at $V_1$ may be 24 volts, that at $V_2$ may be 38 volts, and the voltage at $V_3$ may be 5 volts, then the selected voltage at which sense comparator 105 switches may be 30 volts.

If the power source (not shown) has a configuration such that the only voltage that is supplied is 24 volts at $V_1$, then sense comparator 105 output is in the high state, turning on routing transistor 108. When routing transistor 108 is turned on, the voltage output of DC-to-DC converter 101 is connected to output terminal $Vout_2$, and the 5 volts generated by the DC-to-DC converter 101 at its voltage output pin is thereby applied to $Vout_2$. Conversely, if the power source (not shown) is configured such that 38 volts appears at $V_2$ and 5 volts at $V_3$, then sense comparator 105 switches to the low state at its output, turning off routing transistor 108. The voltage output terminal of DC-to-DC converter 101 is thereby decoupled from $Vout_2$, and the 5 volts applied at $V_3$ appears at $Vout_2$ because of the direct connection between those two terminals. DC-to-DC converter 101 produces 24 volts at its voltage output terminal by virtue of the action of voltage feedback transistor 104, described above, and this output voltage appears at $Vout_1$ through the action of blocking circuitry 107, also described above.

Additional circuitry is provided to prevent damage to circuitry components during transient conditions. At power on or power off, the switching circuitry may not have established what the required output voltages should be. Under this circumstance, a high voltage might appear on the line carrying the voltage at $V_3$. Transient protection comparator 106 is included to prevent this condition. A second reference voltage, $Vref_2$ is supplied to one input of transient protection comparator 106. A second input of transient protection comparator 106 is coupled to input $V_3$ which, as described above, is directly connected to $Vout_2$, and the output of routing transistor 108. $Vref_2$ is chosen to be greater than the voltage to be provided at $V_3$ but less than the absolute component breakdown voltages that are attached to $Vout_2$. In normal operation, the output of transient protection comparator 106 is in the high state. The output of transient protection comparator 106 is connected in parallel with the output of sense comparator 105, and thence to the control element of routing transistor 108. Thus, in normal operation, the state of the control signal at the control element of routing transistor 108 is determined by the state of the output of sense comparator 105. In particular, if the output of sense comparator 105 switches low, then it pulls both the output of transient protection comparator 106 and the control element of routing transistor 108 low; sense comparator 105 must be able to sink any necessary current in this state. Conversely, should a transient condition occur such that the voltage at input $V_3$ exceeds $Vref_2$, transient voltage comparator 106 switches low, thereby tuning off routing transistor 108 independent of the state of sense comparator 105. In this condition, transient protection comparator 106 must sink the necessary current. When the transient subsides, and the voltage on the line connected to $V_3$ drops below $Vref_2$, transient protection comparator 106 switches high, and normal operation obtains thereafter. A more detailed understanding of the operation of the invention may be had by referring now to FIG. 2 depicting a schematic diagram of one embodiment.

Figure 2:
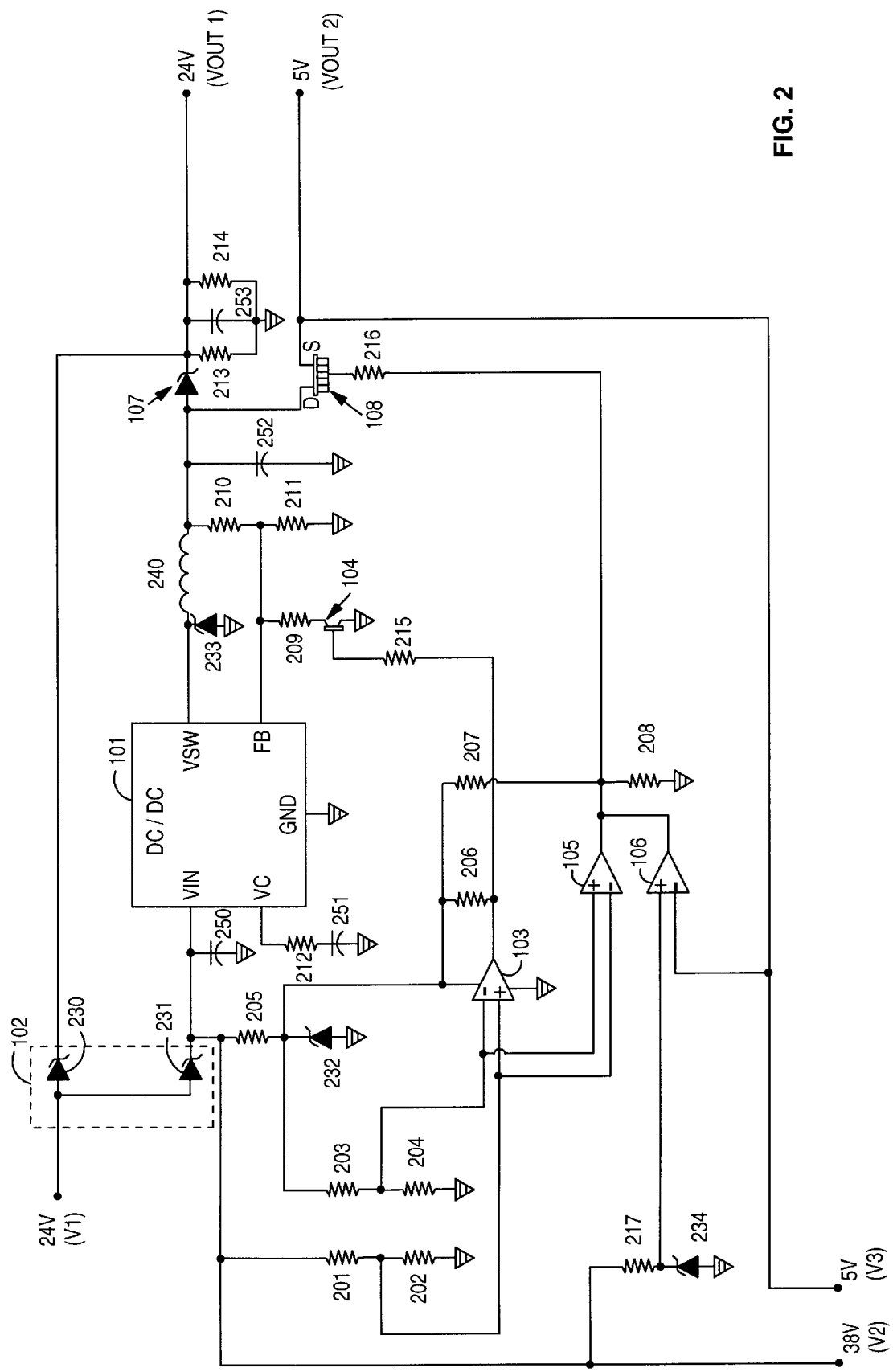
FIG. 2 illustrates a schematic drawing of an embodiment of the present invention.

An embodiment in which the voltage at $V_1$ may be 24 volts, the voltage at $V_2$ may be 38 volts, and that at $V_3$ may be 5 volts, is illustrated in the schematic diagram in FIG. 2. The 24 volt terminal, $V_1$ is connected to the input of blocking circuitry 102 which may comprise diode 230 and diode 231 connected with their anodes in parallel, this parallel connection forming the input to blocking circuitry 102. The cathode of diode 230 forms one output of blocking circuitry 102, and the cathode of diode 231 forms another output of blocking circuitry 102. The cathode of diode 230 is directly passed through to the 24 volt output, Vout$_1$. The cathode of diode 231 is connected to the voltage input terminal of DC-to-DC converter 101. The 38 volt input, V$_2$, is also connected to the cathode of diode 231 thus, the voltage input to DC-to-DC converter 101 is provided either by the 24 volt power supply (not shown) or by the alternative power supply (also not shown) providing the pair of 38 volts and 5 volts, respectively.

The DC-to-DC converter 101 has four input/output terminals and a ground connection. In addition to the voltage input terminal VIN, the terminals comprise a voltage output terminal, VSW, a compensation terminal, VC, and a feedback terminal, FB. Input voltage is provided to DC-to-DC converter 101 at VIN, as described above. Capacitor 250 is connected between terminal VIN and ground as a storage device to provide the peak currents sometimes required by DC-to-DC converter 101. Resistor 212 and capacitor 251 connected in series form a compensating network connected between VC and ground in order to stabilize the internal amplifiers in DC-to-DC converter 101. Filtering of the chopped output voltage from DC-to-DC converter 101 is accomplished by the filtering network comprising diode 233, inductor 240, capacitor 252 and capacitor 255 when DC-to-DC converter 101 is producing a 24 volt output.

Diode 233 is connected in shunt between terminal VSW and ground, the anode of diode 233 forming the ground connection. Inductor 240 is connected in series between terminal VSW and the input to blocking circuitry 107. Blocking circuitry 107 may be a diode 107. The input to blocking circuitry 107 in such an embodiment is the anode of diode 107 and the output is formed by the cathode of diode 107. Capacitor 252, forming part of the circuitry filtering the voltage output of DC-to-DC converter 101, is connected between the junction of inductor 240 and the anode of diode 107, and ground. Capacitor 255, also forming part of the circuitry filtering the voltage output of DC-to-DC converter 101, is connected between the cathode of diode 107 and ground. The cathode of diode 107 is also connected to the 24 volt output terminal, Vout$_1$. Resistor 213 and resistor 214 are connected in shunt across capacitor 255 as bleeder resistors.

The output voltage of DC-to-DC converter 101 is determined by the voltage appearing at feedback terminal FB. This voltage is determined by voltage divider resistor 211, voltage divider resistor 210, and resistor 209 and feedback transistor 104. The resistor network comprising resistor 210 and resistor 211 form a voltage divider connected between the junction of inductor 240 and the anode of diode 107, and ground. Feedback terminal FB is connected to the junction of resistor 210 and resistor 211.

One terminal of resistor 209 is also connected to feedback terminal FB. The other terminal of resistor 209 is serially connected to the control element, which may be the collector of voltage feedback transistor 104, which may be an NPN bipolar transistor. The emitter of voltage feedback transistor 104 is connected to ground and the base of voltage feedback transistor 104 is connected to the output of feedback comparator 103 through resistor 215, which is an isolation resistor between the base-emitter voltage of voltage feedback transistor 104 and the output of feedback comparator 103. The operation of feedback comparator 103 and voltage feedback transistor 104 will now be described in detail.

Automatic switching of the output voltage of DC-to-DC converter 101, depending on the power source (not shown) connected to the device is accomplished by the action of feedback comparator 103 and voltage feedback transistor 104. In such an embodiment, voltage is supplied to the integrated circuit by the network comprising resistor 205 and Zener diode 232. which are connected in series. Diode 232 may be a 20 volt Zener diode. One terminal of resistor 205 is connected to the junction of the cathode of diode 231 and the 38 volt terminal, V$_2$. The other terminal of resistor 205 is connected to the cathode of diode 232, the anode of which is connected to ground.

Voltage input to feedback comparator 103 is provided at the junction between resistor 205 and the cathode of diode 232. This voltage also forms Vref$_1$ through the action of a voltage divider comprising resistor 203 and resistor 204. Resistor 203 and resistor 204 are serially connected between the junction of resistor 205 and the cathode of diode 232, and ground. Vref$_1$ is provided at the junction of resistor 203 and resistor 204. This junction is connected to the inverting input of feedback comparator 103. This is the reference input of feedback comparator 103. In this embodiment, Vref$_1$ may be 10 volts.

The voltage appearing on the line connected to V$_2$ is coupled to the non-inverting input of feedback comparator 103 through a voltage divider network comprising resistor 201 and resistor 202. Resistor 201 and resistor 202 are serially connected between the line connected to V$_2$, and ground. The junction between resistor 201 and 202 is connected to the non-inverting input of feedback comparator 103. This is the control input of feedback comparator 103. Voltage divider resistor 201 and resistor 202 may form a division ratio of 1:3.

If a power source (not shown), which provides 38 volts at terminal V$_2$ and 5 volts at terminal V$_3$, is connected to the device, then the voltage at the junction of resistor 201 and 202 is approximately 13 volts in an embodiment in which the voltage divider formed by resistor 201 and 202 has a division ratio of 1:3. Thus, the voltage at the non-inverting input of feedback comparator 103 is greater than the voltage Vref$_1$ appearing at the non-inverting input of feedback comparator 103 in an embodiment in which Vref$_1$ is 10 volts.

Then, the output of feedback comparator 103 is high being pulled up by the action of pull-up resistor 206 connected between the output of feedback comparator 103 and the junction of resistor 205 and the cathode of diode 232.

The high at the output of feedback comparator 103 turns on feedback transistor 104. This places resistor 209 in parallel with resistor 211. The voltage output of DC-to-DC converter 101 is now determined by the voltage divider network comprising resistor 210 and the parallel combination of resistor 209 and resistor 211. The output voltage of DC-to-DC converter 101 in this case may be 24 volts. The 5 volts provided at terminal V$_3$ in this circumstance is passed directly through to voltage output terminal Vout$_2$.

Conversely, if the power source (not shown) connected to the device provides a voltage of 24 volts at terminal V$_1$, the voltage at the non-inverting input of feedback comparator 103 is approximately 8 volts in this embodiment, as a result of the action of the voltage divider network, resistor 201 and resistor 202 receiving the 24 volts provided at the junction of the network resistor 201 and 202 with the line connected to V$_2$. Now, the control input of feedback comparator 103 is at a lower voltage than the reference input of feedback comparator 103. As a consequence, the output of feedback comparator 103 is low, turning off feedback transistor 104. Now the voltage at feedback terminal FB of DC-to-DC converter 101 is determined by the action of voltage divider network formed by resistor 210 and resistor 211. The division ratio of this divider network is such that the voltage output of DC-to-DC converter 101 is 5 volts. The 5 volt output of DC-to-DC converter 101 is coupled to Vout$_2$ by the action of routing transistor 108 which will now be described in detail.

Steering of the output voltage of DC-to-DC converter 101 to terminal Vout$_2$ is accomplished by routing transistor 108 and its control circuitry comprising sense comparator 105 and transient protection comparator 106. The non-inverting input of sense comparator 105 which may be another of the comparator amplifiers comprising a type LM339 quad voltage comparator integrated circuit is connected to Vref$_1$. The non-inverting input of sense comparator 105 is the reference input. Vref$_1$ is provided by the action of voltage divider network resistor 203 and resistor 204 serially connected between the cathode of diode 232 and ground, as described above. The inverting input of sense comparator 105 is connected to the junction between resistor 201 and resistor 202 forming a voltage divider network serially connected between the line connected to V$_2$, and ground. The inverting input of sense comparator 105 is the control input.

Note that the non-inverting input of sense comparator 105 is connected to the inverting input of feedback comparator 103 described above and the inverting input of sense comparator 105 is connected to the non-inverting input of feedback comparator 103. Hence, the action of sense comparator 105 is opposite the action of feedback comparator 103.

The output of sense comparator 105 is connected to the control element, which may be the gate, of routing transistor 108 which may be a metal oxide semiconductor field effect transistor ("MOSFET"). In such an embodiment, the output of sense comparator 105 is connected to the gate of MOSFET routing transistor 108 through resistor 216 which provides for circuit stability of routing transistor 108. Resistor 208 connected between the output of sense comparator 105 and ground is a pull-down resistor, and resistor 207 connected between the output of sense comparator 105 and the cathode of diode 232 is a pull-up resistor. If a power source (not shown) providing 24 volts at V$_1$ is connected to the invention, then approximately 8 volts appears at the inverting input of sense comparator 105 through the action of voltage divider network resistor 201 and resistor 202. This is less than the Vref$_1$ of 10 volts, which appears at the non-inverting input of sense comparator 105. As a consequence, the output of sense comparator 105 is high, turning on routing transistor 108.

Thus, in an embodiment in which routing transistor 108 is a MOSFET, the output of DC-to-DC converter 101 is coupled to Vout$_2$ through routing transistor 108, the drain of which is connected to the junction of inductor 240 and the anode of diode 107. As described above, in this circumstance, the output voltage of DC-to-DC converter 101 is 5 volts as determined by the action of voltage divider network resistor 210 and resistor 211. The output voltage of DC-to-DC converter 101 is provided at terminal Vout$_2$ through the connection of that terminal to the source of routing transistor 108.

Conversely, if the power source connected to the invention provides 38 volts at terminal V$_2$ and 5 volts at terminal V$_3$, approximately 13 volts appears at the inverting input of sense comparator 105 through the action of voltage divider network resistor 201 and resistor 202. This voltage is higher than Vref$_1$ of 10 volts. In this circumstance, the output of sense comparator 105 is low and this pulls the gate of routing transistor 108 low, turning off routing transistor 108. This isolates Vout$_2$ from the voltage output of DC-to-DC converter 101, and the 5 volts at terminal V$_3$ is passed directly through to Vout$_2$. Furthermore, in this case, the output voltage of DC-to-DC converter 101 is set at 24 volts by the action of the voltage divider network comprising resistor 210 and resistor 211 and resistor 209 in parallel, as described above. The 24 volt output of DC-to-DC converter 101 is passed through to V$_{out}$ by diode 107.

Before the steady state conditions described above obtain, transient conditions can exist during power on and power off. During power on/power off, periods can exist where high voltages appear on the line connected to terminal V$_3$. These high voltages might destroy the circuitry connected to this line. Transient protection comparator 106 operates to prevent this. The inverting input of transient comparator 106 which may be another comparator amplifier comprising a type LM339 commercial quad voltage comparator integrated circuit, is connected to terminal V$_3$. The non-inverting input of transient protection comparator 106 is connected to a second voltage reference Vref$_2$. In the present embodiment, Vref$_2$ is derived from the network comprising resistor 217 and diode 234 which may be a 6.2 volt Zener diode. Resistor 217 and diode 234 are serially connected between terminal V$_2$ and ground. Vref$_2$ is supplied at the junction between resistor 217 and diode 234 and this voltage is provided to the non-inverting input of transient protection comparator 106. The output of transient protection comparator 106 is connected in parallel with the output of sense comparator 105. The network comprising resistor 217 and diode 234 provides a reference voltage of Vref$_2$ independent of whether the power source (not shown) connected to the invention provides either 24 volts at terminal V$_1$ or the combination of 38 volts at V$_2$ and 5 volts at V$_3$, respectively, by virtue of the connection between terminal V$_2$ and the cathode of diode 231. Hence, if a voltage in excess of 6.2 volts, in an embodiment in which diode 234 is a 6.2 volt Zener diode, appears on the line connected to terminal V$_3$, the output of transient protection comparator 106 will be low, turning off routing transistor 108 independent of the state of sense comparator 105. Thus, the output of DC-to-DC converter 101 is isolated from output terminal Vout$_2$ independent of the state of sense comparator 105.

When the transient condition subsides, and the voltage appearing on the line connected to terminal V$_3$ drops below Vref$_2$ or 6.2 volts in this embodiment, transient protection comparator 106 switches states and the output goes high. At that time, sense comparator 105 takes over the control of routing transistor 108, and the steady state operation of the invention as described above ensues.

Although the present invention and its advantages have been described in detail, it should be understood that various changes, substitutions and alterations can be made herein without departing from the spirit and scope of the invention as defined by the appended claims.

What is claimed is:

1. A circuit comprising:
   circuitry operable for receiving one or more selected ones of a plurality of possible input voltages;
   circuitry operable for sensing an input level of said one or more selected ones of a plurality of possible input voltages;
   a DC-to-DC converter coupled to said receiving circuitry and to said sensing circuitry; and
   circuitry operable for controlling said DC-to-DC converter to output an output voltage as a function of said input level of said one or more selected ones of a plurality of possible input voltages, wherein said DC-to-DC converter is the only DC-to-DC converter in said circuit, wherein said one or more selected ones of a plurality of possible input voltages includes first, second, and third input voltages, wherein when said input level corresponds to said first input voltage said DC-to-DC converter is controlled by said controlling circuitry to output said output voltage to have an output level equal to said third input voltage, and wherein when said input level corresponds to said second input voltage said DC-to-DC converter is controlled by said controlling circuitry to output said output voltage to have an output level equal to said first input voltage.

2. The circuit as recited in claim 1, further comprising:

circuitry for outputting a voltage equal to said first input voltage when said input level corresponds to said first input voltage; and circuitry for outputting a voltage equal to said third input voltage when said input level corresponds to said second input voltage.

3. The circuit as recited in claim 1, further comprising:

blocking circuitry having an input for receiving one of said one or more selected ones of a plurality of possible input voltages, said blocking circuitry having one or more outputs, wherein said blocking circuitry prevents voltage/current feedback from said one or more outputs to said input.

4. A circuit comprising:

circuitry operable for receiving one or more selected ones of a plurality of possible input voltages;

circuitry operable for sensing an input level of said one or more selected ones of a plurality of possible input voltages;

a DC-to-DC converter coupled to said receiving circuitry and to said sensing circuitry; and circuitry operable for controlling said DC-to-DC converter to output an output voltage as a function of said input level of said one or more selected ones of a plurality of possible input voltages, wherein said DC-to-DC converter includes a feedback terminal operable for selecting said output voltage of said DC-to-DC converter, wherein said controlling circuitry further includes a feedback control circuit coupled to said feedback terminal, wherein said feedback control circuitry comprises a feedback comparator operable for comparing said one or more selected ones of a plurality of possible input voltages at an input terminal of said DC-to-DC converter with a reference voltage, and a feedback network operable for selection of said output voltage of said DC-to-DC converter by an output of said feedback comparator.

5. The circuit as recited in claim 4, wherein said feedback network further comprises:

a voltage divider network having a selectable divider ratio, said voltage divider operable for providing a feedback voltage to said feedback terminal of said DC-to-DC converter; and a voltage feedback transistor, said voltage feedback transistor receiving a control voltage from said output of said feedback comparator wherein said voltage feedback transistor is operable for selecting said selectable divider ratio.

6. The circuit as recited in claim 5, wherein said voltage divider further comprises:

first and second resistors serially connected between said output of said DC-to-DC converter and ground;

a third resistor having a first terminal connected to a junction between said first and second resistors, and a second terminal connected to a controlled element of said voltage feedback transistor.

7. The circuit as recited in claim 6, wherein said voltage feedback transistor is an NPN bipolar transistor having an emitter terminal, base terminal, and collector terminal, said collector terminal being said controlled element connected to said second terminal of said third resistor, said base terminal receiving said control voltage from said feedback comparator, and said emitter terminal being connected to ground.

8. A circuit comprising:

circuitry operable for receiving one or more selected ones of a plurality of possible input voltages;

circuits operable for sensing an input level of said one or more selected ones of a plurality of possible input voltages;

a DC-to-DC converter coupled to said receiving circuitry and to said sensing circuitry; and circuitry operable for controlling said DC-to-DC converter to output an output voltage as a function of said input level of said one or more selected ones of a plurality of possible input voltages; and a sense comparator operable for comparing said one or more selected ones of a plurality of possible input voltages with a reference voltage, said sense comparator having an output for outputting a control voltage for controlling a routing switch coupled to an output of said DC-to-DC converter.

9. The circuit as recited in claim 8, wherein said routing switch comprises:

a MOSFET transistor having a gate terminal, drain terminal, and source terminal, said gate terminal receiving said control voltage from said output of said sense comparator, said drain terminal connected to said output of said DC-to-DC converter, and said source terminal connected to an output terminal.

10. The circuit as recited in claim 8, further comprising:

a transient protection comparator operable for comparing a second one of said one or more selected ones of a plurality of possible input voltages with a second reference voltage, said transient protection comparator having an output operable for overriding said output of said sense comparator.

11. The circuit as recited in claim 4, wherein said feedback comparator further comprises:

a comparator operational amplifier having an inverting input, a non-inverting input, and an output, said inverting input receiving said reference voltage, and said non-inverting input receiving a voltage proportional to said one or more selected ones of a plurality of possible input voltages at said input terminal of said DC-to-DC converter, wherein said feedback network is operable for selection of said output voltage of said DC-to-DC converter by said output of said comparator operational amplifier.

12. The circuit as recited in claim 8, wherein said sense comparator further comprises:

a comparator operational amplifier having an inverting input, a non-inverting input, and an output, said non-inverting input receiving said reference voltage, and said inverting input receiving a voltage proportional to said one or more selected ones of a plurality of possible input voltages at said input terminal of said DC-to-DC converter, wherein said output of said comparator outputs a control voltage for controlling said routing switch.

13. The circuit as recited in claim 10, wherein said transient protection comparator further comprises:

a comparator operational amplifier having an inverting input, a non-inverting input, and an output, said non-inverting input receiving said second reference voltage, and said inverting input connected to an output terminal of said circuit, wherein said output of said comparator operational amplifier is operable for overriding said output of said sense comparator.

14. A circuit for controlling multiple input voltages to produce a given output comprising:

an input for receiving a first selected voltage;

a pair of inputs for receiving a first alternative input voltage and a second selected voltage;

an output for outputting said second selected voltage, said output connected in parallel with said input for receiving said second selected voltage;

first circuitry for blocking current/voltage feedback between an input and a pair of outputs, said input being connected to said input for receiving said first selected voltage;

a DC-to-DC converter having a voltage input, a voltage output and a feedback terminal, said voltage input connected to a first one of said outputs of said first blocking circuitry;

a first comparator having a control input, a reference input, and an output, said reference input connected to a first reference voltage, and said control input receiving a voltage proportional to said first alternative input voltage;

a second comparator having a control input, a reference input, and an output, said reference input connected to said first reference voltage, and said control input connected in parallel with said control input of said first comparator;

a third comparator having a control input, a reference input, and an output, said reference input connected to a second reference voltage, and said control input connected in parallel with said input for receiving said second selected voltage;

voltage feedback circuitry having an input, an output and a control terminal, said control terminal receiving an output voltage from said output of said first comparator, said input receiving an voltage from said voltage output of said DC-to-DC converter, and said output providing a feedback voltage to said feedback terminal of said DC-to-DC converter;

second circuitry for blocking voltage/current feedback between an input terminal and an output terminal, said input terminal receiving said output voltage from said output terminal of said DC-to-DC converter, wherein said output terminal outputs said first selected voltage, said output terminal being connected in parallel with a second one of said pair of outputs of said first blocking circuitry; and steering circuitry operable for providing an output voltage to said output for outputting said second selected voltage, said steering circuitry having an input, an output and a control terminal, said output terminal connected to said output for outputting said second selected voltage, said input receiving said output voltage from said DC-to-DC converter, said control terminal connected in parallel with said output of said second comparator and said output of said third comparator, thereby receiving one or more control voltages therefrom, said control voltages operable for controlling said steering circuitry.

15. The circuit as recited in claim 14, wherein said voltage feedback circuitry further comprises:

a voltage divider network having a selectable divider ratio, said voltage divider operable for providing a feedback voltage to said feedback terminal of said DC-to-DC converter; and a voltage feedback transistor, said voltage feedback transistor receiving a control voltage from said output of said first comparator wherein said voltage feedback transistor is operable for selecting said selectable divider ratio.

16. A method for controlling multiple input voltages to produce a given output in a circuit comprising a single DC-to-DC converter, said method comprising the steps of:

receiving one or more selected ones of a plurality of possible input voltages;

sensing an input level of said one or more selected ones of a plurality of possible input voltages; and controlling said DC-to-DC converter to output an output voltage as a function of said input level of said one or more selected ones of a plurality of possible input voltages, wherein said one or more selected ones of a plurality of possible input voltages includes first, second, and third input voltages, wherein when said input level corresponds to said first input voltage said DC-to-DC converter is controlled to output said output voltage to have an output level equal to said third input voltage, and wherein when said input level corresponds to said second input voltage said DC-to-DC converter is controlled to output said output voltage to have an output level equal to said first input voltage.

17. The method as recited in claim 16, further comprising the steps of:

outputting a voltage equal to said first input voltage when said input level corresponds to said first input voltage; and outputting a voltage equal to said third input voltage when said input level corresponds to said second input voltage.

* * * * *